United States Patent [19]
Kellen et al.

[11] 3,879,218
[45] Apr. 22, 1975

[54] APPARATUS FOR CONTROLLING THE FEEDING OF REACTANT TO A FUEL CELL

[75] Inventors: Francis J. Kellen, Mequon; Scott S. Tomter, Milwaukee, both of Wis.

[73] Assignee: Teledyne Isotopes, Westwood, N.J.

[22] Filed: May 17, 1973

[21] Appl. No.: 361,166

[52] U.S. Cl. ............................................. 136/86 B
[51] Int. Cl. ........................................ H01m 27/12
[58] Field of Search ................................. 136/86 B

[56] References Cited
UNITED STATES PATENTS

| | | | |
|---|---|---|---|
| 3,390,015 | 6/1968 | Wilson | 136/86 B |
| 3,592,694 | 9/1971 | Urbach | 136/86 B |
| 3,753,780 | 9/1971 | Fetterman | 136/86 B |

Primary Examiner—Allen B. Curtis
Attorney, Agent, or Firm—Fleit & Jacobson

[57] ABSTRACT

Apparatus for controlling the feeding of reactant to a fuel cell having a valve means for regulating the amount of reactant fed to the fuel cell, means in operative relationship with the fuel cell for sensing concentration of the reactant in the fuel cell, means for controlling operation of the valve means in accordance with the concentration of reactant and means electrically isolating, with respect to at least D.C. energy, the terminals of the fuel cell from the controlling means and the sensing means to eliminate leakage of electrical energy between the fuel cell terminals, the sensing means, and the controlling means so that the voltage read-out from the sensing means is accurate and is not affected by any electrical leakage from the fuel cell.

8 Claims, 5 Drawing Figures

APPARATUS FOR CONTROLLING THE FEEDING OF REACTANT TO A FUEL CELL

This invention relates to fuel feed systems and more particularly to apparatus for controlling the feeding of reactant, such as hydrazine, to a fuel cell.

The control of the hydrazine concentration in hydrazine fuel cells has long been a limiting factor on fuel cell performance, life and efficiency. Throughout the industry over the last several years, much work has been directed toward the development of a simple and reliable method to control the amount of hydrazine concentration in the anolyte solution.

Various methods have been employed in attempts to accurately control hydrazine concentration. For example, methods have been used that respond to the output load current and which control the hydrazine concentration with respect to the output characteristics of the fuel cell. Still other methods have incorporated a response to both the load current and the output voltage of the cell while others have involved compensation for operating temperature.

Still other control means, such as that described in U.S. Pat. No. 3,542,597, have utilized sensing cells in combination with the fuel cell whereby detector electrodes in the sensing cell are immersed in the electrolyte-reactant solution and are maintained at a current density corresponding to a desired reactant concentration. Means are provided for sensing the voltage difference between the electrodes of the sensing cell and means are provided for adding fuel or oxidant to the circulating electrolyte in response to changes sensed in the sensing cell voltage.

Although each of the previously used methods has served the purpose, none has proved entirely satisfactory under all conditions of service. For example, the load current response method is inherently insensitive to autocatalytic decomposition, common electrolyte losses, changes in anode efficiency, or unforeseen or temporary overconsumptions. Likewise, the load current and output voltage method operates too close to the "knee" of the voltage-fuel concentration curve to properly handle rapid changes in load currents. This method is also complicated if output voltage regulation is utilized.

Methods, such as described in U.S. Pat. No. 3,542,597, have also been adequate, but this method has suffered from the disadvantage that electrical leakage paths have occurred from the fuel cell through the anolyte loop to the sensing cell electrodes. This is an extremely significant disadvantage in that any voltage or current referenced to the fuel cell and applied to the sensing cell will establish leakage paths through the anolyte loop and will render any measurements with respect to the negative terminal of the fuel cell, as well as any fuel cell taps, inaccurate not repeatable, and incapable of supporting a control function. Moreover, if the impedance of the sensing cell is low, current paths will be established and result in undesirable and excessive heat generation, low output voltage, and low overall efficiency.

It is, therefore, an object of the present invention to provide apparatus for controlling the feeding of reactant to a fuel cell whereby electrical isolation exists between the fuel cell and the sensing cell in order to prevent electrical leakage paths therebetween.

Another object is to provide a system to measure and control hydrazine concentration in solution.

Still another object is to provide a hydrazine concentration in solution.

Still another object is to provide a hydrazine concentration control apparatus which accurately and simply controls the hydrazine concentration control in a fuel cell.

Additional objects and advantages of the invention will be set forth in part in the descraption which follows, and in part will be obvious from the description or may be learned by practice of the invention. The objects and advantages are realized and attained by means of the instrumentalities and combinations particularly pointed out in the appended claims.

To achieve these and other objects the present invention provides apparatus for controlling the feeding of reactant to a fuel cell having a source of electrical energy, valve means for regulating the amount of reactant fed to the fuel cell, means in operative relationship with the fuel cell for sensing the concentration of the reactant in the fuel cell, means in circuit with the valve means, the sensing means and with the energy source for controlling the operation of the valve means in accordance with the concentration of reactant in the fuel cell, and means in operative relationship for electrically isolating, with respect to at least D.C. electrical energy, the terminals of the fuel cell from the controlling means and from the sensing means to eliminate leakage of electrical energy between the fuel cell terminals, the sensing means and the controlling means.

As here embodied, the energy source may be the fuel cell and the isolating means comprises a transformer. The controlling means may include means in circuit relationship with the isolating means for providing voltage references of predetermined values, means in circuit with the providing means and with the sensing means for establishing the duration and the period between pulses and for selectively passing the pulses through the sensing means to enable the determination of the reactant concentration in the fuel cells, and means in circuit relationship with the sensing means and with the valve means for comparing the voltage developed by the sensing means, as a result of the pulses passing through the sensing means, with a predetermined voltage level and for selectively regulating the duration of opening of the valve means in accordance with the concentration of reactant in the fuel cell as determined by the sensing means.

The regulating means includes a monostable timing circuit for selectively opening the valve means for predetermined lengths of time to enable appropriate amounts of reactant to enter the fuel cell. The amount of reactant which enters the fuel cell is a timed function, with the quantity, or amount of reactant being dependant upon the "head" of the reactant in the reactant storrage tank. In addition, the passing means includes a current limit circuit for limiting the amplitude of the current pulses passed through the sensing means.

Accordingly, the present invention provides apparatus for accurately controlling the feeding of reactant to a fuel cell and for controlling the concentration of hydrazine in solution.

It is to be understood that both the foregoing general description and the following detailed description are exemplary and explanatory and are not restrictive of the invention.

The accompanying drawings, which are incorporated in and constitute a part of this specification, illustrate an example of a preferred embodiment of the invention and, together with the description, serve to explain the principles of the invention.

Figure 1:
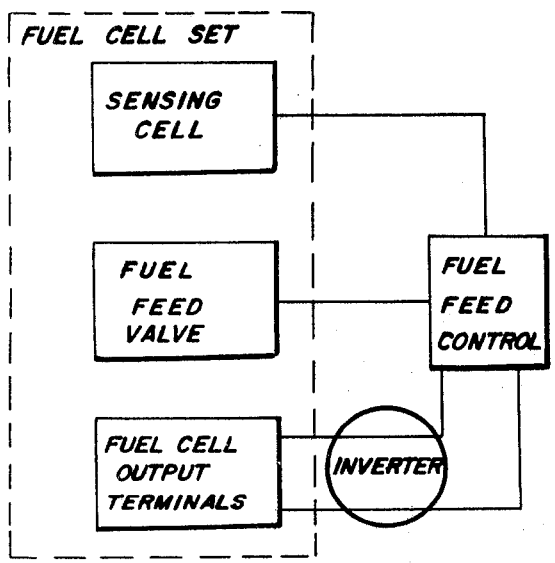
FIG. 1 is a block diagram view of one embodiment of the invention.
Figure 2:
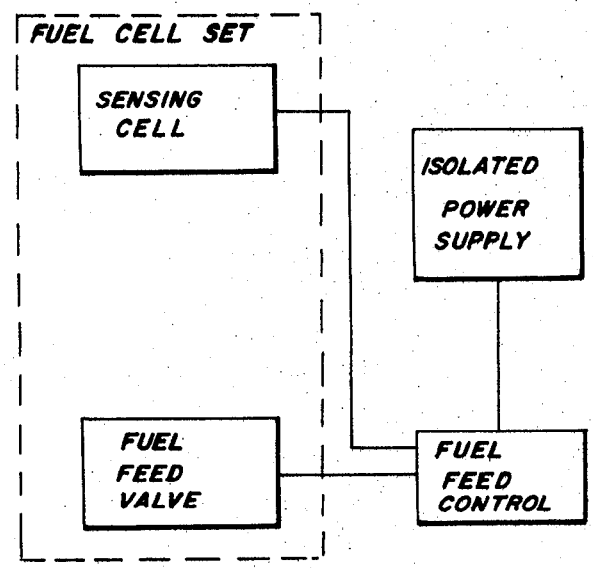
FIG. 2 is a block diagram view of an alternative embodiment of the invention.

With reference now to the drawings, wherein like reference characters designate like or corresponding parts throughout the several views, there is shown in FIG. 1 a basic illustration of the invention wherein the power supply for the circuitry originates with the fuel cell itself. FIG. 2 illustrates an alternative embodiment of the invention whereby the fuel feed control is isolated from the fuel cell by means of providing a separate isolated power supply to the fuel feed control. Although the embodiment of FIG. 2 is contemplated by this invention, the remaining discussion will be with respect to the embodiment of FIG. 1 wherein the power supply for the circuitry originates with the fuel cell.

Figure 3:
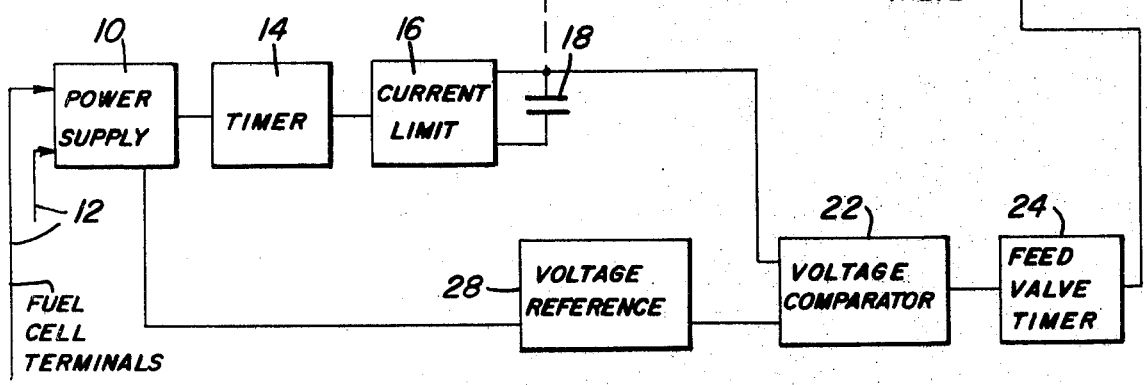
FIG. 3 is a more detailed block diagram view of the embodiment of the invention illustrated in FIG. 1.

FIG. 3 is a more detailed block diagram view of the embodiment of the invention shown in FIG. 1. A power supply 10 for the system receives its primary source of power from fuel cell terminals 12. As illustrated in more detail in FIG. 4, the first stage of power supply 10 is an inverter circuit having a transformer with its secondary center-tapped for ease of rectification. The inverter circuit performs the important function of completely isolating the fuel feed control and the sensing cell from fuel cell terminals 12. This isolation completely and effectively eliminates problems caused by electrical leakage through the anolyte loop and into the electrodes of the sensing cell. Leakage of this type has been a persistent problem in prior control systems, and this invention successfully overcomes the problem.

The second stage of power supply 10 includes a simple filter and series regulator (FIG. 4) to establish voltage references, e.g., 18 volts and 9 volts, required by operational amplifiers located in the fuel feed control. A timing circuit 14 is coupled in circuit with the output of power supply 10 and is used to establish the pulse duration as well as the period between the pulses that are fed to the sensing cell to generate a voltage across the sensing cell electrodes. The value of this voltage indicates the need for additional fuel within the fuel cell. Timing circuit 14, in turn, actuates current limit circuit 16, which regulates the amount of current that will be driven through the sensing cell when timing circuit 14 dictates.

The voltage that develops across sensing cell 18 is fed directly to a voltage comparator 22. If, for example, the voltage developed across cell 18 is less than 1.5 volts, for a hydrazine application, the output of the comparator 22 remains in a low state. If, however, the voltage developed across cell 18 is greater than 1.5 volts, for a hydrazine application, the output of the comparator 22 goes to a relatively high voltage state that triggers a monostable timing circuit or feed valve timer circuit 24 to regulate the duration of the opening of fuel feed valve 26.

In control of hydrazine concentration in hydrazine fuel cells it is know that the amount of current that the anolyte solution can maintain without going into water electrolysis is dependent on the hydrazine concentration. Tests have shown that the voltage across the sensing cell is about 2.3 volts when water electrolysis occurs and that the voltage across the sensing cell drops to about 1 volt when hydrazine is added to the anolyte such that the current load is maintained. The current load to which the anolyte solution can be subjected without going into water electrolysis is, therefore, proportional to the hydrazine concentration.

In the operation of this invention, a constant current of about 100 milliamps, for example, is driven through the electrodes of sensing cell 18 for 0.1 second every 4 seconds. During this 0.1 second when current is flowing, the voltage across the sensing cell is measured and compared to a 1.5 volt reference 28. If the voltage across the sensing cell is greater than 1.5 volts, the anolyte solution is deficient in hydrazine and additional hydrazine is added by opening fuel feed valve 26 for about 0.5 second. If during the 0.1 second when current is flowing, the voltage across the sensing cell is less than the 1.5 volt reference, adequate hydrazine is present in the anolyte solution and fuel feed valve 26 is kept closed.

This sensing of the voltage across sensing cell 18 occurs about once every 4 seconds, thereby providing adequate repetition to keep the hydrazine concentration effectively constant and also providing adequate time for the effects of polarization and gas buildup around the sensing cell electrodes to be diminished. It is also significant to this invention that the primary source of power is isolated from sensing cell 18 and from the fuel feed control comprised of power supply 10, timer 14, current limiting circuit 16 and voltage comparator 22. This isolation completely eliminates any problems that would otherwise be caused by electrical leakage through the anolyte loop and into the electrodes of the sensing cell.

Figure 5:
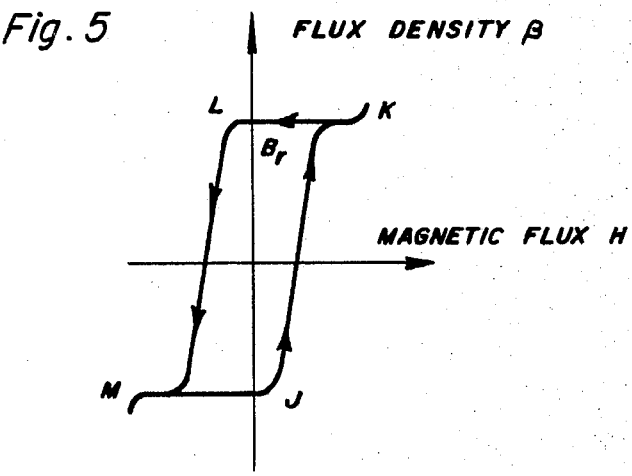
FIG. 5 is a curve illustrating operation of the transformer of FIG. 4.
Figure 4:
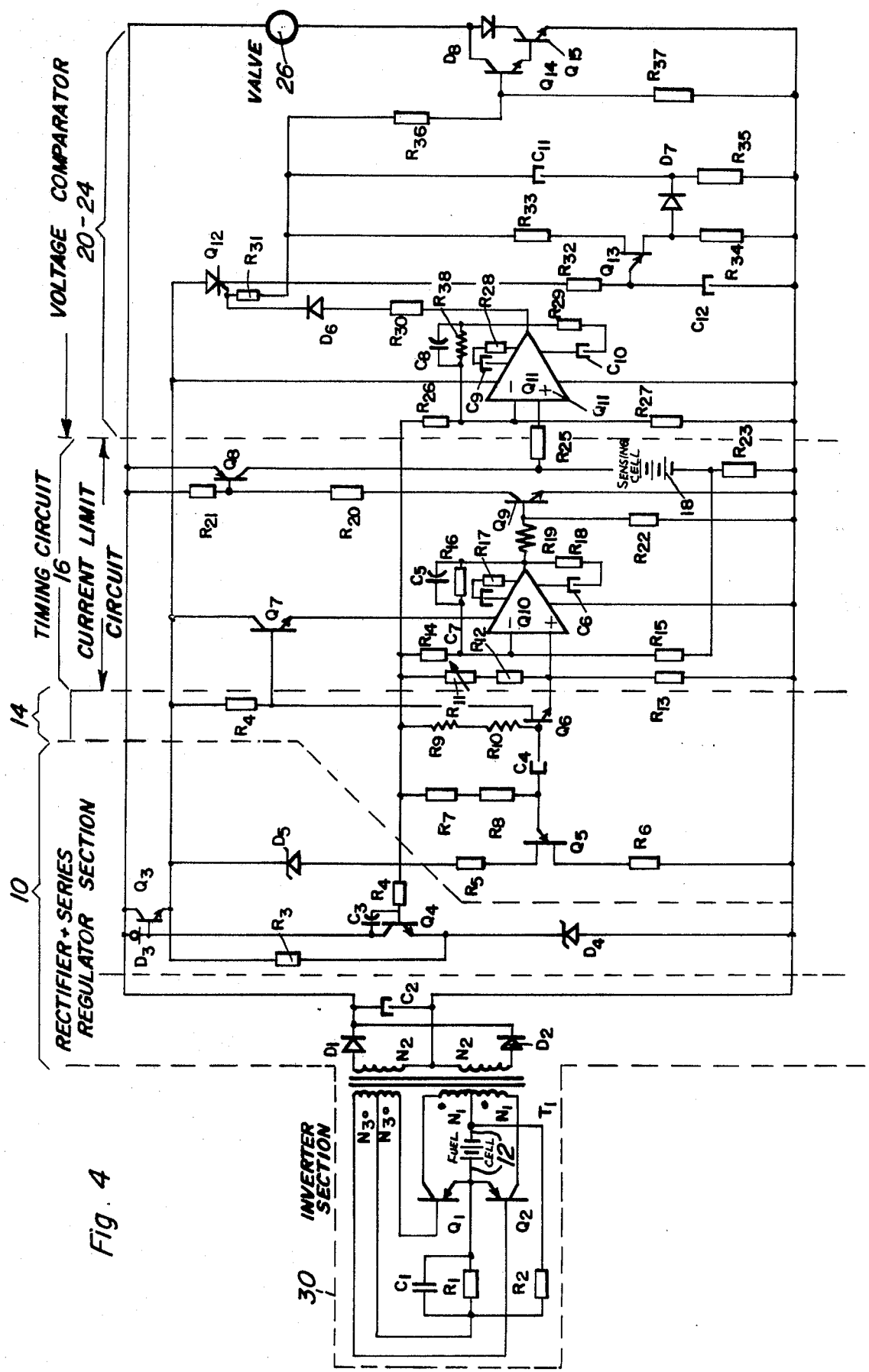
FIG. 4 is a schematic diagram of the invention illustrated in FIG. 3.

A more detailed schematic diagram of the invention is illustrated in FIG. 4, and FIG. 5 is a graphical illustration of the hysteresis characteristic of the transformer utilized in the inverter circuit 30.

In detailed operation of the invention illustrated in FIG. 4, assume that transistor Q1 is nonconducting, Q2 conducting and that the transformer T1 is saturated at point J on the B-H curve of FIG. 5. When Q1 starts to conduct, the voltage developed across the primary windings N1 induces voltage in the feedback windings N3 and drives Q1 into saturation rapidly to turn Q2 off.

When this transition is completed, constant voltage, $V_P = V_{CC} - V_{CE(sat)}$, is applied to N1. Since $d\phi/dt = V_P/N1$, flux $\phi$ must increase in the transformer core at a constant rate, causing flux density $B = \phi/A$ to increase from point J toward point K on the B-H curve. As long as the core remains nonsaturated, magnetization current $i_m$ (= $H/N1$) is small, but as saturation (point K) is approached high magnetization current $i_m$ is required to keep $d\phi/dt$ constant. When reflected load current, plus this sharply increasing magnetization current exceeds the collector current which Q1 can supply (with the drive available), Q1 begins to come out of saturation causing $V_P$ to decrease. The feedback voltage ($V_{FB}$) and collector current ($I_C$) decrease regeneratively, turning Q1 off and ending the half cycle.

As flux in the transformer core collapses from point K to point B, voltage which biases transistor Q2 into conduction and initiates the next half cycle is induced in the winding. The operation is similar to the first half cycle except that supply voltage (less $V_{CE(sat)}$) is applied to the other half of the primary, causing a reversal of polarity in the induced output voltage. Q2 conducts until the core is driven into negative saturation at point M on the B-H curve. As flux collapses from M to J, the full cycle is completed.

In this circuit R1 and R2 form a simple voltage divider to bias the transistors to conduction before oscillation starts. A good rule of thumb for the base starting bias developed by this circuit is to use 0.3 volts, for example, for germanium transistors and 0.5 volts for silicon. This voltage, $V_B$, is equal to R1 $V_{CC}$/R1 + R2. Since R1 occurs in the feedback circuit in series with the base of each circuit half, R1 must not exceed $R_B$, which is equal to $V_{FB} - V_{EB}/1_B$. If R1 is set equal to $R_B$, then R1 and R2 are uniquely determined for any given starting bias. The resistance of R2 is uniquely determined for any given starting bias. The value of R2 may be adjusted if starting is not satisfactory. The advantage of this straightforward starting technique is that only resistors need to be added to the circuit.

Still referring to FIG. 4, diodes D1 and D2 along with capacitor C2 form a standard full wave rectifier circuit in conjunction with the center-tapped secondary of transformer T1. At this point in the circuit, a good source of isolated D.C. power is obtainable. This source of power is then regulated by the use of a series regulator.

Transistor Q3 is used in a series regulator configuration. Nine volt and 18 volt levels, for example, are established by zener diodes D4 and D5, and feedback is provided by transistor Q4 to the base of transistor Q3, which is current controlled by diode D3. Resistor R4 limits the base current to transistor Q4. Capacitor C3 is a frequency compensation compacitor to insure a stable feedback configuration, and resistor R3 insures adequate drive for zener diode D4.

A simple timing circuit 16 is used to establish the pulse duration as well as the period between pulses. Resistors R9 and R10 bias transistor Q6 in the ON state. Resistors R7 and R8 charge capacitor C4 through the base emitter circuit of transistor Q6. When the charge on capacitor C4 reaches the point where transistor Q5 conducts, the voltage immediately decays to the point where transistor Q6 stops conducting. Transistor Q5 remains conducting until the charge on capacitor C4 is insufficient to provide the necessary current to maintain Q5 in the conducting state. At the time the voltage decays, transistor Q6 is switched to the OFF state and remains so until the bias provided by resistors R9 and R10 is sufficient to overcome the effects of the discharged capacitor and again switch transistor Q6 to the ON state. Thus resistors R7, R8, R9 and R10 can be selected such that timing of both the ON and the OFF states of transistor Q6 can be independently adjusted.

When transistor Q6 is in the ON state, transistor Q7 is biased in the OFF state thereby keeping the output of amplifier Q10 in the low voltage state which, in turn, turns off transistors Q8 and Q9 to prevent current from flowing through sensing cell 18. When transistor Q6 is in the OFF state, transistor Q7 is biased ON through resistor R24. This turns on amplifier Q10 which, in turn, biases transistor Q9 which, in turn, biases ON transistor Q8 through resistors R20 and R21 to permit current to flow through sensing cell 18 to ground through resistor R23. The voltage developed across resistor R23 is fed back to the inverting input of amplifier Q10 through the bridge comprised of resistors R11, R12, R13, R14, and R15 which, in turn, limits the magnitude of the current flowing through the sensing cell as a function of the calibration resistor R11. Frequency compensation of amplifier Q10 is accomplished by capacitors C6 and C7 along with resistors R17 and R18. Resistor R16 limits the gain of amplifier Q10 and along with capacitor C5 provides the necessary phase and gain control to insure stable operation.

Amplifier Q11 is used as a differential amplifier with the reference voltage being established by resistor R26 and R27. Resistor R26 is used to calibrate the amplifier at about 1.6 volts in this hydrazine fuel cell example. If the voltage across the sensing cell is below the 1.6 volt level, the output of amplifier Q11 remains in the low state thus keeping the output timing monostable circuit in the OFF state thereby keeping the output transistors Q14 and Q15 in the OFF state. If the voltage across the sensing cell is greater than 1.6 volts, the output of amplifier Q11 goes to the high state thereby firing SCR Q12 through diode D6 and resistor R30. When SCR Q12 is fired, voltage is applied to the unijunction oscillator circuit as well as to the output transistors.

Transistors Q14, Q15 and diode D8 form a standard darlington amplifier. These transistors are biased into saturation through resistor R36 when Q12 is in the conducting state. Resistor R37 assures fast turn off of transistors Q14 and Q15 and provides protection against spurious signals.

The unijunction oscillator circuit is comprised of components R32, C12, R33, Q13 and R34. The charge on capacitor C12 is governed by R32. When the voltage across capacitor C12 reaches the peak point voltage of transistor Q13, transistor Q13 conducts through resistor R34, diode D7, and resistor R35. Transistor Q13 remains in the conducting state until the voltage on capacitor C12 is reduced to the valley point voltage of transistor Q13 at which time transistor Q13 ceases conduction. At the time Q12 conducts capacitor C11 starts to charge and reaches full charge before transistor Q13 conducts. When transistor Q13 conducts, the voltage spike created across R35 is transmitted by capacitor C11 to the cathode of Q12 which causes Q12 to reset to the nonconducting state and thereby complete the timing cycle.

Frequency compensation of amplifier Q11 is accomplished by capacitors C9 and C10 along with resistors R28 and R29. Resistor R38 limits the gain of amplifier Q11 and along with capacitor C8 provides the necessary phase and gain control to insure stable operation.

The control system has been operated and various tests have been conducted in order to measure performance of the system. In a first series of tests, the fuel feed control was powered from a separate supply, as illustrated in the embodiment of FIG. 2. The fuel cell was run for about a period of 8 hours and 25 titrations were taken during this period. Six different sensing cells were installed on the operating fuel cell during this period. Some of the cells were new and previously unused while others were completely blackened due to previous extensive use.

21 titrations were made after the fuel cell reached operating temperature and all except two fell within a range of 0.35 percent hydrazine ± 0.075 percent. This test was used to verify that a hydrazine level could be maintained with an operating fuel cell for a period of approximately 8 hours. This test was run without regard to a specific hydrazine concentration required by the fuel cell since simple adjustment can raise or lower the hydrazine concentration to the desired level. Upon completion of this test, the hydrazine concentration level was raised to approximately 0.45 percent.

Since this initial test, various fuel cells have been operated about 20 hours with the fuel feed control of this invention. These tests were made for a number of reasons and not directly to verify the design of the fuel feed control. In at least one of these tests, the fuel feed control was operated directly from the fuel cell terminals with the addition of an isolation transformer as shown in FIGS. 1 and 4. In this particular test no other source of electrical power was used other than that generated by the fuel cell. The hydrazine concentration was controlled by the sensor at 0.45 percent during the entire test. The fuel consumption was also monitored during a 16-hour test. The fuel cell was operated continuously with a 10 amp load. During the 16-hour test, the fuel cell consumed 4.5 liters of hydrazine hydrate while being controlled by the fuel feed control as previously described. This proved to be a great savings in hydrazine usage which directly benefits the heat transfer characteristics of the entire fuel cell system.

The fuel feed control of this invention has been tested on life tests. The fuel feed control has successfully controlled the hydrazine concentration in the anolyte solution to 0.4 percent ± 0.1 percent for over 200 hours. This elapsed time has been continuous except for periodic shutdowns. The reasons for shutdown include such things as anolyte pump failure, anolyte pump motor failure, anolyte changes, etc., none of which have been related to the fuel feed control. At least 118 hours of continuous testing has been accomplished without shutdown for anolyte changes or failures. The results of the testing show that the fuel feed control of this invention maintains a very accurate and constant hydrazine concentration.

The present invention thus provides for a simple hydrazine concentration control method which accurately controls a level of hydrazine concentration in solution. The present invention also provides for an apparatus for efficiently and accurately controlling the feeding of reactant to a fuel cell and for preventing electrical leakage paths from occurring through the anolyte loop and between the fuel cell and the sensing cell of the fuel feed control. This complete electrical isolation of fuel feed control from the fuel cell results in extremely consistent and reliable data as to the reactant concentration as determined by the voltage from the sensing cell.

The invention in its broader aspects is not limited to the specific details shown and described and departures may be made from such details without departing from the principles of the invention and without sacrificing its chief advantages.

What is claimed is:

1. Apparatus for controlling the feeding of reactant to a fuel cell, comprising:

a source of electrical energy;

valve means for regulating the amount of reactant fed to said fuel cell;

sensing means in operative relationship with said fuel cell for sensing concentration of said reactant in said fuel cell;

driver means for applying to said sensing means a pulsed driving current whose duration is on the order of 0.1 seconds and whose pulses are spaced by on the order of at least 4 seconds;

means in circuit with said valve means, said sensing means and with said energy source for controlling operation of said valve means in accordance with the concentration of reactant in said fuel cell; and means in operative relationship for selectively isolating, with respect to at least D.C. electrical energy, the terminals of said fuel cell from said controlling means and said sensing means to eliminate leakage of electrical energy between said fuel cell terminals, said sensing means, and said controlling means.

2. Apparatus as in claim 1 wherein said energy source includes the fuel cell.

3. Apparatus as in claim 2 wherein said isolating means includes a transformer.

4. Apparatus as in claim 2 wherein said controlling means include:

means in circuit relationship with said isolating means for providing voltage references of predetermined values;

means in circuit with said providing means and with said sensing means for establishing the duration and the period between pulses and for selectively passing said pulses through said sensing means to enable determination of the reactant concentration in said fuel cell; and means in circuit relationship with said sensing means and with said valve means for comparing the voltage developed by said sensing means, as a result of said pulses passing through said sensing means, with a predetermined voltage level and for selectively regulating the duration of opening of said valve means in accordance with the concentration of reactant in the fuel cell as determined by said sensing means.

5. Apparatus as in claim 4 wherein said regulating means includes a monostable timing circuit for selectively opening said valve means for predetermined lengths of time to enable measured amounts of reactant to enter said fuel cell.

6. Apparatus as in claim 4 wherein said passing means include a current limit circuit for regulating the amplitude of said current pulses passed through said sensing means.

7. Apparatus as in claim 4 for feeding hydrazine to said fuel cell and wherein said valve means is opened to permit additional hydrazine to be fed into the fuel cell when the voltage developed by said sensing means is greater than 1.5 volts.

8. Apparatus as in claim 4 wherein said transformer secondary is center-tapped and wherein said reference voltage providing means includes a rectifier for rectifying the output from said transformer secondary.

* * * * *